United States Patent
Arendt et al.

(10) Patent No.: US 12,016,267 B2
(45) Date of Patent: Jun. 25, 2024

(54) WALK POWER MOWER WITH GROUND SPEED RESPONSIVE TO FORCE APPLIED TO A HANDLE GRIP BY THE OPERATOR

(71) Applicant: The Toro Company, Bloomington, MN (US)

(72) Inventors: Peter M. Arendt, Richfield, MN (US); Chris A. Wadzinski, Inver Grove Heights, MN (US)

(73) Assignee: THE TORO COMPANY, Bloomington, MN (US)

( * ) Notice: Subject to any disclaimer, the term of this patent is extended or adjusted under 35 U.S.C. 154(b) by 582 days.

(21) Appl. No.: 16/885,154

(22) Filed: May 27, 2020

(65) Prior Publication Data
US 2020/0375102 A1 Dec. 3, 2020

Related U.S. Application Data

(60) Provisional application No. 62/853,369, filed on May 28, 2019.

(51) Int. Cl.
| | | |
|---|---|---|
| *A01D 34/68* | (2006.01) | |
| *A01D 34/69* | (2006.01) | |
| *A01D 34/82* | (2006.01) | |
| *A01D 101/00* | (2006.01) | |
| *B62D 51/04* | (2006.01) | |

(52) U.S. Cl.
CPC ......... *A01D 34/6806* (2013.01); *A01D 34/69* (2013.01); *A01D 34/824* (2013.01); *A01D 2034/6843* (2013.01); *A01D 2101/00* (2013.01); *B62D 51/04* (2013.01)

(58) Field of Classification Search
CPC ........ A01D 2034/6843; A01D 2101/00; A01D 34/6806; A01D 34/68; A01D 2034/6825; A01D 34/685; A01D 34/69; A01D 34/67; A01D 34/824; A01D 69/00–69/12; A01B 33/082; B62D 51/04; B62D 51/06
See application file for complete search history.

(56) References Cited

U.S. PATENT DOCUMENTS

| | | | |
|---|---|---|---|
| 2,937,706 A | 5/1960 | Chandler | |
| 3,225,853 A | 12/1965 | Norton et al. | |
| 5,442,901 A * | 8/1995 | Niemela | A01D 34/6806 |
| | | | 180/65.6 |
| 6,082,083 A | 7/2000 | Stalpes et al. | |
| 6,470,981 B1 * | 10/2002 | Sueshige | B60K 7/0007 |
| | | | 180/65.6 |

(Continued)

FOREIGN PATENT DOCUMENTS

| | | | |
|---|---|---|---|
| FR | 2755573 | 5/1998 | |
| JP | 2011042248 A * | 3/2011 | ............... B62B 3/00 |
| WO | 2017158095 | 9/2017 | |

*Primary Examiner* — Thomas B Will
*Assistant Examiner* — Madeline I Runco
(74) *Attorney, Agent, or Firm* — Mueting Raasch Group (57) ABSTRACT

A walk power mower comprises a housing having an upwardly and rearwardly extending handle that is gripped by an operator. A load cell is responsive to the force applied by the operator to the handle during a grass mowing operation. Input from the load cell is used by a control system to vary the ground speed of the mower in accordance with the sensed operator applied force through control of an electric traction drive motor.

20 Claims, 4 Drawing Sheets

(56) References Cited

U.S. PATENT DOCUMENTS

| | | | |
|---|---|---|---|
| 6,834,485 B2* | 12/2004 | Grandrud | A01D 34/6806 |
| | | | 56/11.6 |
| 9,650,061 B2* | 5/2017 | Katayama | G08C 17/02 |
| 9,706,706 B2* | 7/2017 | Barendrecht | A01D 34/006 |
| 10,039,229 B2 | 8/2018 | Wadzinski et al. | |
| 10,111,381 B2 | 10/2018 | Shaffer et al. | |
| 10,123,478 B2 | 11/2018 | Shaffer et al. | |
| 10,306,831 B2* | 6/2019 | Porter | A01D 34/81 |
| 10,729,066 B2* | 8/2020 | Yan | E01H 5/098 |
| 10,906,573 B2* | 2/2021 | Chung | B62B 5/0073 |
| 11,191,210 B2* | 12/2021 | Wilks | A01D 34/69 |
| 2009/0266042 A1* | 10/2009 | Mooney | B60L 50/52 |
| | | | 56/14.7 |
| 2010/0025124 A1 | 2/2010 | Arpino | |
| 2013/0046448 A1 | 2/2013 | Fan et al. | |
| 2019/0297776 A1* | 10/2019 | Bejcek | F16H 63/304 |
| 2019/0307066 A1* | 10/2019 | Jiang | A01D 34/37 |
| 2020/0000023 A1* | 1/2020 | Chung | A01D 34/6806 |
| 2020/0107497 A1 | 4/2020 | Ferrell et al. | |
| 2020/0245555 A1* | 8/2020 | Colber | A01D 34/824 |
| 2022/0132732 A1 | 5/2022 | Ren et al. | |

* cited by examiner

WALK POWER MOWER WITH GROUND SPEED RESPONSIVE TO FORCE APPLIED TO A HANDLE GRIP BY THE OPERATOR

TECHNICAL FIELD

This invention relates to a walk power mower having a variable speed traction drive system whose speed is controlled by an operator according to the force applied by the operator to a handle grip of the mower.

BACKGROUND OF THE INVENTION

U.S. Pat. No. 6,082,083 to Stalpes, which is assigned to The Toro Company, the assignee of this invention, relates to a walk power mower having a variable speed traction drive system which propels the mower in a forward direction only. An upwardly and rearwardly extending handle is provided at the rear of the mower. The handle includes a handle grip which is gripped by an operator who walks behind the mower to guide and maneuver the mower during a grass cutting operation.

The handle grip in Stalpes slides downwardly on the handle when the operator pushes forwardly on the handle grip as the operator walks forwardly. The degree of downward motion of the handle grip is commensurate with how fast the operator walks. The degree of downward motion of the handle grip is used to automatically control the speed of the traction drive system to generally or substantially match the ground speed of the mower to the walking speed of the operator. The Stalpes patent has long been commercialized in the Personal Pace® line of walk power mowers manufactured and sold by The Toro Company.

U.S. Pat. Nos. 10,039,229, 10,123,478 and 10,306,831, also assigned to The Toro Company, extend the use of the slidable handle grip of Stalpes to walk power mowers that have bidirectional traction drive systems that propel the mower in both forward and reverse directions. In this group of patents, when the handle grip is pushed downwardly from a neutral position of the handle grip as the operator walks forwardly, the forward ground speed of the mower is adjusted commensurately. Similarly, when the handle grip is pulled upwardly from a neutral position of the handle grip as the operator walks rearwardly, the rearward ground speed of the mower is also adjusted commensurately.

While the Stalpes type handle is an effective way to match the ground speed of the mower to the walking speed of the operator in both forward and now in reverse directions as well, the slidable handle grips require some non-negligible amount of up and down travel. This is particularly true in the bi-directionally driven mowers in which the handle grip travel is approximately double that needed in a mower that is driven only in a forward direction. This complicates the design of the mower handle. Accordingly, this invention provides an improved handle grip that requires substantially no up and down travel in order to control the ground speed of the mower.

SUMMARY OF THE INVENTION

One aspect of this invention relates to a walk power mower which comprises a housing having a rotary grass cutting blade. An electric motor provides the housing with powered movement over the ground at a variable ground speed. A handle extends rearwardly from the housing to allow an operator to walk behind the housing and hold the handle and thereby guide the housing during its powered movement over the ground. A force sensor is responsive to force applied by the operator to the handle when the operator walks in a forward direction. A control system receives input from the force sensor to control the at least one electric motor to increase and decrease the ground speed of the housing in the forward direction when the operator applies more or less force, respectively, to the handle when the operator walks in the forward direction.

BRIEF DESCRIPTION OF THE DRAWINGS

This invention will be described in detail hereafter in the Detailed Description, when taken in conjunction with the following drawings, in which like reference numerals refer to like elements throughout.

DETAILED DESCRIPTION

Figure 1:
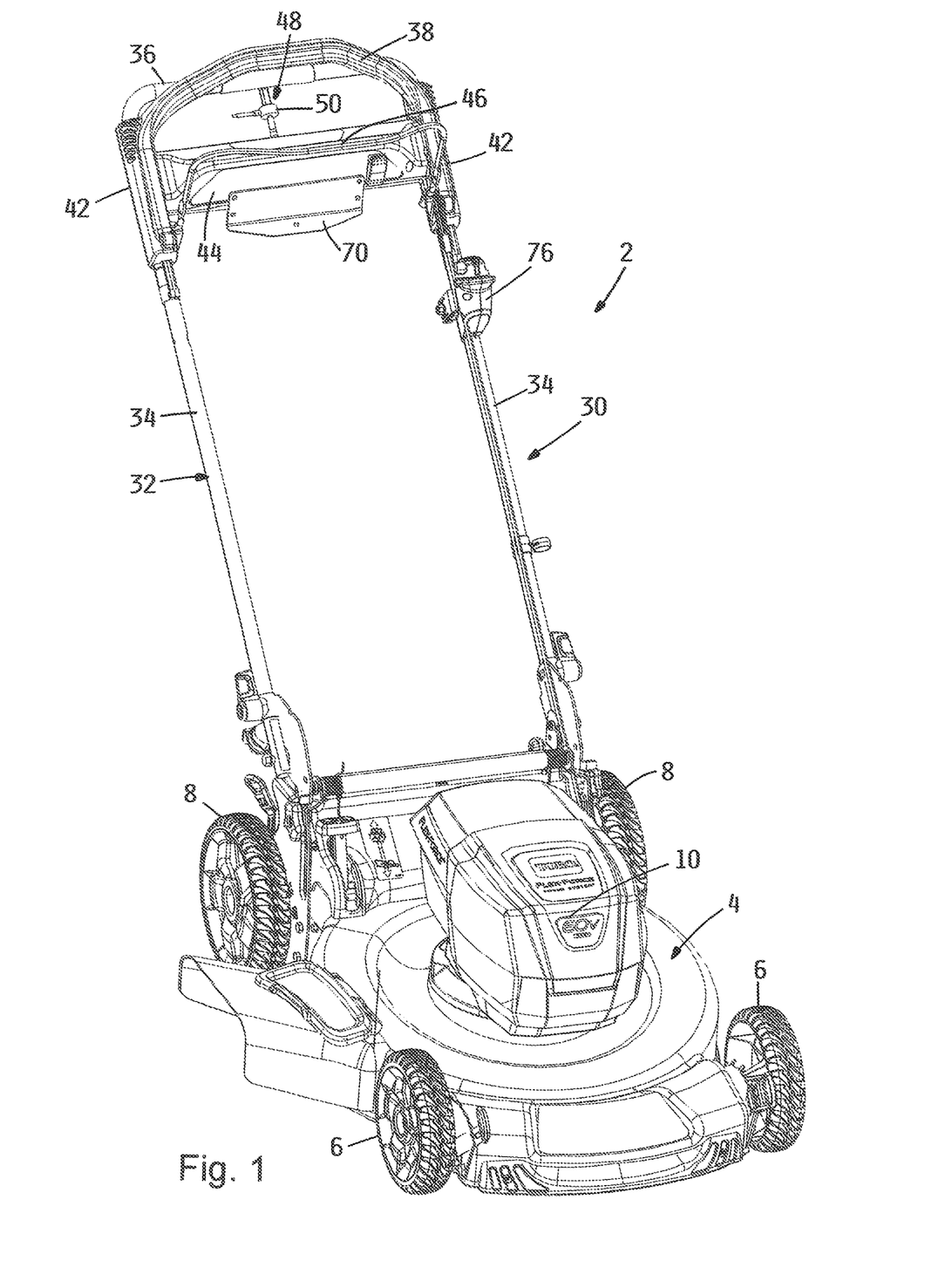
FIG. 1 is a front perspective view of a walk power mower according to one embodiment of this invention.

A walk power mower according to one embodiment of this invention is illustrated generally as 2 in FIG. 1. Mower 2 has a cutting deck 4 supported for movement over the ground by a pair of rotatable front wheels 6 and a pair of rotatable rear wheels 8. One pair of wheels, e.g., rear wheels 8, is driven by a traction drive system that self-propels deck 4 over the ground. Alternatively, both pairs of wheels 6, 8 may be driven in an all-wheel drive mode. A laterally extending rotatable roller (not shown) may be substituted for one or both pairs of wheels 6, 8 if so desired.

A prime mover 10 is carried on cutting deck 4. In one embodiment of this invention, prime mover 10 may be a source of electric power, such as an onboard 60 Volt battery pack 11 depicted in FIG. 4, that may be used to drive one or more electric motors. In an alternative embodiment, prime mover 10 may be an internal combustion engine that provides mechanical power to a drive shaft that is used to rotate an electrical energy generating device such as a generator. The electric power of the generator may then be used, either solely or in combination with energy also supplied by an onboard battery pack, to drive one or more electric motors. In this alternative embodiment, the mechanical power being generated by the engine may also be used to mechanically drive some of the components of mower 2 while the electrical power being generated by the engine driven generator is used to drive other components of mower 2 through the one or more electric motors.

Figure 2:
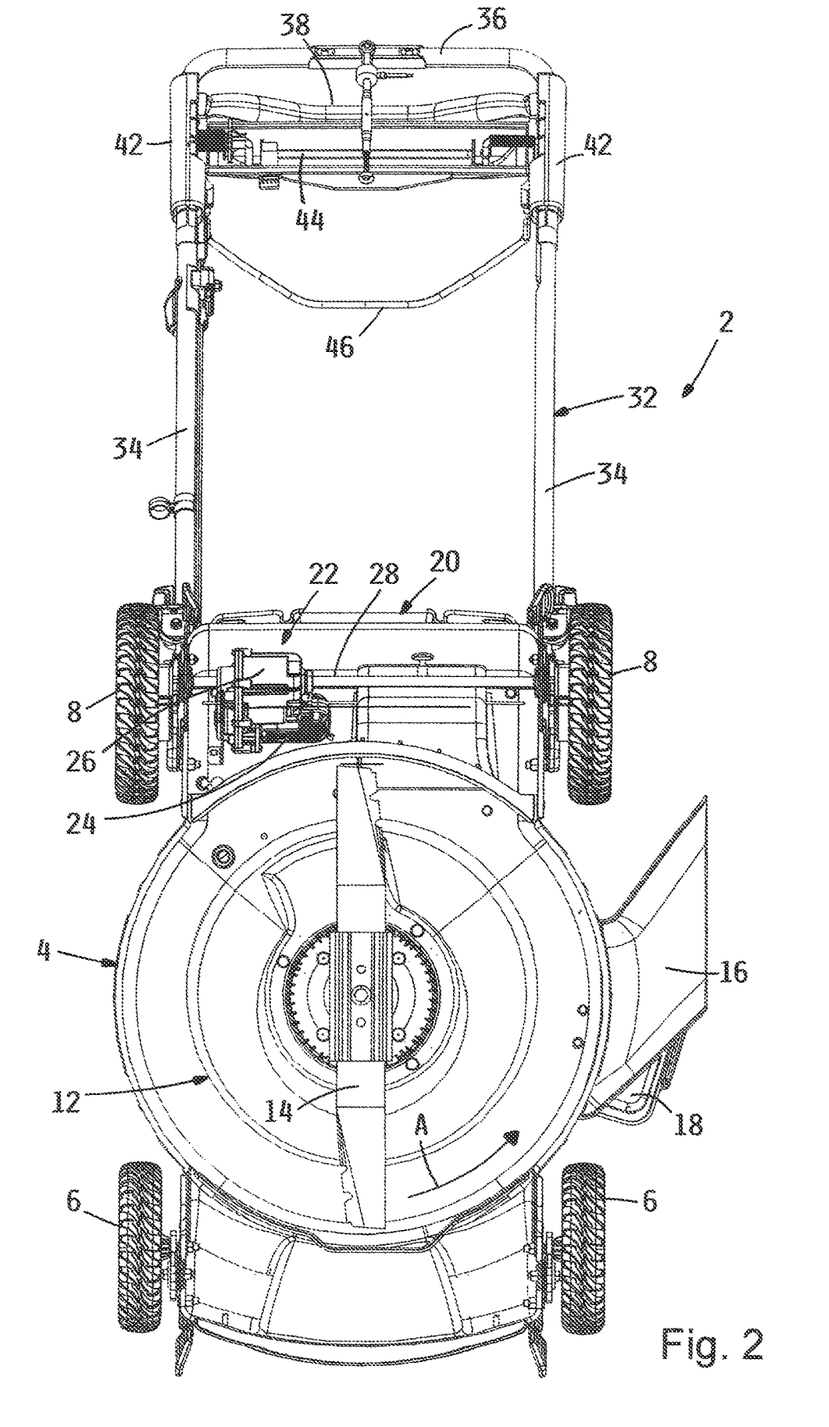
FIG. 2 is a bottom plan view of the mower of FIG. 1.

Referring now to FIG. 2, the underside of cutting deck 4 has a substantially open bottom which permits uncut grass to extend up into a cutting chamber 12 as cutting deck 4 passes over an area of grass that is to be cut. At least one substantially horizontal cutting blade 14 is attached to a drive shaft of the engine or an electric motor to be rotated in the direction of the arrow A to cut the grass within cutting chamber 12 to a shorter length. The grass clippings generated by the cutting action of cutting blade 14 are carried by airflow generated by cutting blade 14 in a circumferential path in the direction of the arrow A until the grass clippings are discharged from cutting deck 4 beneath a side discharge chute 16 when cutting deck 4 is in a side discharge mode of operation. Alternatively, if side discharge chute 16 is removed and the side discharge opening is closed by a side door 18, the grass clippings may alternatively be discharged through a rear discharge opening when a rear door 20 is opened in a rear discharge mode of operation or downwardly through the open bottom of cutting deck 4 in a mulching mode of operation if neither of the side or rear doors 18, 20 are open. Mower 2 may also have only a single mode of discharging grass clippings from cutting chamber 12 rather than being equipped with a plurality of selectively usable modes.

As also shown in FIG. 2, one embodiment of a traction drive system comprises an electric transmission 22 comprising an electric traction drive motor 24 that operates through a speed reduction mechanism 26 to drive an axle 28 that mounts rear wheels 8. Preferably, traction drive motor 24 and speed reduction mechanism 26 are integrated together into a single unit, but this need not necessarily be the case. Traction drive motor 24 and speed reduction mechanism 26 could be separate from one another with some type of drive connection, such as a belt drive, coupling the two together. The term "electric transmission" as used herein is intended to mean an electric motor and a speed reduction mechanism used to rotate one or more wheels of cutting deck 4 for propulsion purposes whether or not the electric motor and speed reduction mechanism are integrated together or are separate from one another but drivingly coupled to each other. Speed reduction mechanism 26 may include a differential if so desired to allow the wheels in the pair of wheels being driven by electric transmission 22 to automatically rotate at different speeds during turns of cutting deck 4. Additionally, an electric traction drive motor 24 without a speed reduction mechanism 26, such as a stepper motor, could be used in place of electric transmission 22 if so desired.

A handle 30 extends upwardly and rearwardly from the rear of cutting deck 4 in a known manner. The handle includes a handle base 32 comprising at least a pair of parallel, laterally spaced handle tubes 34. In one embodiment of this invention, handle tubes 34 are connected together at their upper ends by a cross member 36. The lower ends of handle tubes 34 are preferably pivotally connected to the rear of cutting deck 4 to allow handle 30 to be held in any one of a plurality of angularly adjusted positions relative to cutting deck 4 to suit users of different heights. During operation of mower 2, a user grips handle 30 and walks on the ground behind cutting deck 4 to guide and operate mower 2.

In addition to handle base 32, handle 30 further comprises a handle grip 38 carried on the upper end of handle base 32. Handle grip 38 is preferably long enough in a lateral direction for an operator to grip handle grip 38 with both hands. In one embodiment of this invention, a pair of legs 42 may telescopically mount handle grip 38 to handle tubes 34 for up and down sliding motion along handle tubes 34. In this embodiment, handle grip 38 may additionally have an escutcheon plate 44 that extends between and unites legs 42 of handle grip 38. Handle grip 38 as depicted herein is similar to the handle grip disclosed in U.S. Pat. No. 6,082,083, which is incorporated by reference herein for all relevant and consistent teachings relating to handle 30, handle base 32 and handle grip 38.

A U-shaped control bail 46 is pivotally mounted to handle grip 38 for starting and stopping the rotation of cutting blade 14. This may be done in various ways. In one embodiment where cutting blade 14 of mower 2 is rigidly fixed to the drive shaft of prime mover 10, bail 46 must be pivoted from the open position shown in FIG. 1 to a closed position adjacent handle grip 38 to allow prime mover 10 to be operated. In an alternative embodiment where cutting blade 14 is indirectly connected to the drive shaft of prime mover 10 through a blade brake clutch (not shown), bail 46 must be pivoted into the closed position to engage the clutch. The blade brake clutch embodiment has the advantage of being able to stop the rotation of cutting blade 14 by disengaging the clutch without having to stop the rotation of the drive shaft of prime mover 10 in order to stop the rotation of cutting blade 14.

At least a portion of handle grip 38 is able to move or deflect very slightly relative to handle base 32 under a forward force component which the operator applies to handle grip 38 as the operator walks in a forward direction. In a preferred embodiment of this invention, the same portion of handle grip 38 further moves or deflects slightly in a reverse direction relative to handle base 32 under a rearward force component which the operator applies to handle grip 38 as the operator walks in a rearward direction. A force sensor 48, e.g. a load cell 50 utilizing metal foil strain gauge technology, is compressed by the forward force component to control the speed of electric transmission 22 when driving mower 2 forwardly in a manner that varies with the increase in the forward force component. Similarly, in a preferred embodiment of this invention, force sensor 48 is put into tension under the rearward force component to control the speed of electric transmission 22 when driving mower 2 rearwardly in a manner that varies with the increase in the rearward force component. The forward and reverse control algorithms that vary the speed or torque of electric transmission 22 in concert with changes in the corresponding force components may be linear or non-linear, may be the same or different from one another, and may provide the same or different maximum forward and reverse ground speeds of mower 2.

Figure 3:
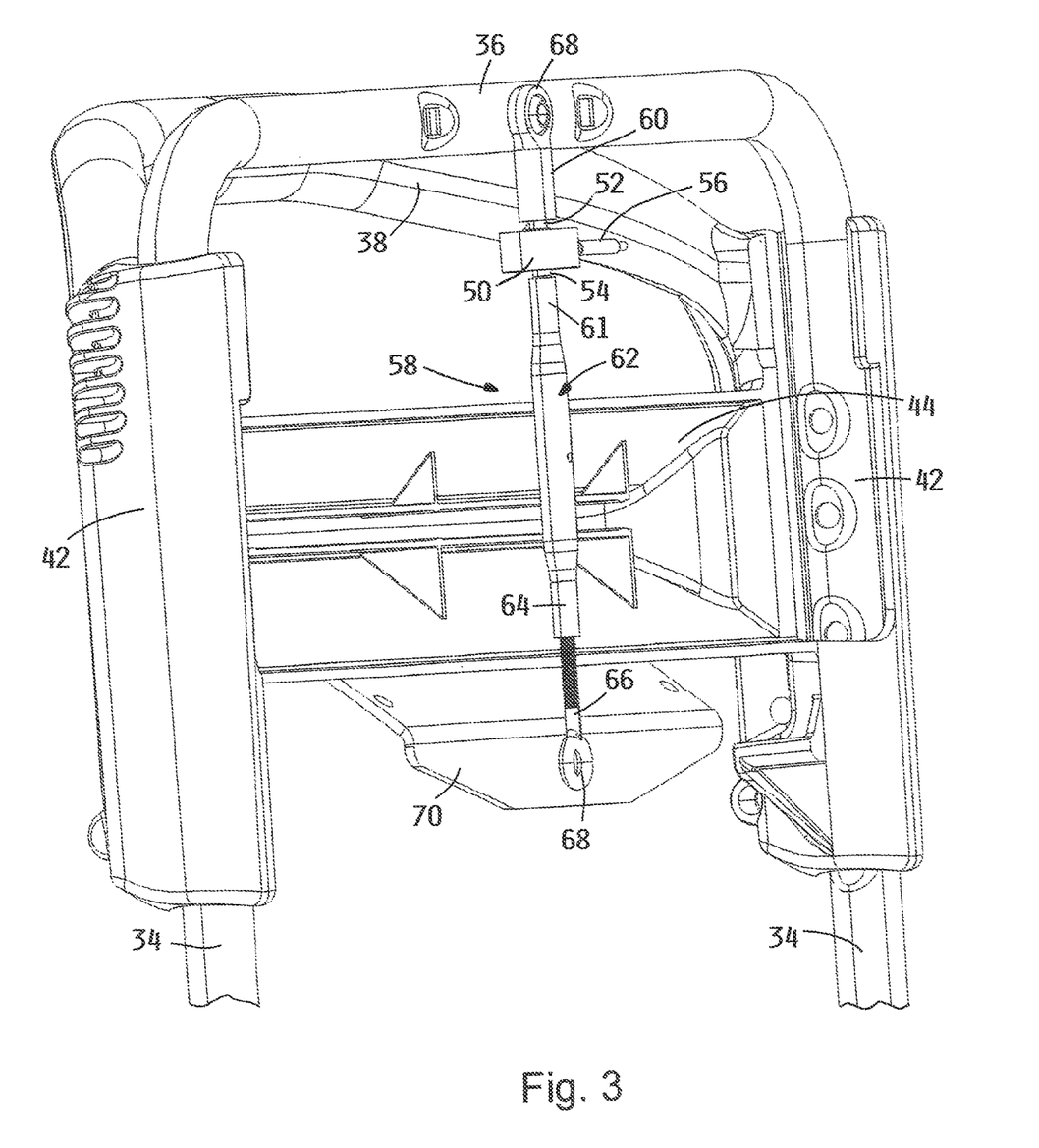
FIG. 3 is a perspective view of a portion of the handle of the mower of FIG. 1, particularly illustrating a turnbuckle which mounts a load cell between a handle base and a movable handle grip of the handle.

Referring now to FIG. 3, one embodiment of force sensor 48 that may be used in this invention comprises a miniature, threaded, in line load cell 50, e.g. a Futek Model LCM300 load cell. Load cell 50 is used in both tension and compression. Load cell 50 includes externally threaded, first and second mounting shafts 52, 54. In addition, load cell 50 includes an electrical cable connection 56 that connects load cell 50 to an electronic controller 72 that will be described later.

Load cell 50 is sandwiched between various portions of a turnbuckle 58 to mount it on handle 30. First mounting shaft 52 of load cell 50 is threaded into an internally threaded upper end 60 of turnbuckle 58. Second mounting shaft 54 is threaded into an internally threaded upper end 61 of a turnbuckle body 62. An internally threaded lower end 64 of turnbuckle body 62 receives an externally threaded lower end 66 of turnbuckle 58. The upper and lower ends 60, 66 of turnbuckle 58 have eyelets 68 for attaching upper end 60 of turnbuckle 58 to cross member 36 of handle base 32 and for attaching lower end 66 of turnbuckle 58 to a mounting bracket 70 that is fixed on handle grip 38, respectively.

When so secured, rotation of turnbuckle body 62 about its axis raises or lowers the vertical position of handle grip 38 relative to handle base 32 without actuating load cell 50. This would permit the operator to adjust the vertical position of handle grip 38 relative to handle base 32 into a desired initial position according to the operator's preferences. Once the operator has adjusted handle grip 38 into whatever initial position that he or she wishes to use, or in embodiments in which the manufacturer establishes a uniform initial position for all operators without the possibility of any operator adjustment, handle 30 is ready for use in a mowing operation.

When mowing, the amount of movement of handle grip 38 relative to handle base 32 that is needed to substantially fully compress and to substantially fully tension load cell 50 to either side of a neutral state to thereby control the ground speed of mower 2 throughout its entire range of ground speed in either forward or reverse is only one/one thousandth (0.001) of an inch. This amount of motion is so small that it is substantially imperceptible to the naked human eye. For all intents and purposes, an operator with normal vision who grips and pushes on handle grip 38 and walks forwardly at whatever speed he or she desires will find that the ground speed of mower 2 generally or substantially matches the operator's walking pace without the operator visually discerning any up or down motion of handle grip 38. The same will be true for operation in the reverse direction. Mower 2 will simply appear to the operator to seamlessly change its ground speed as the operator changes his or her walking pace without any discernible movement of handle grip 38 relative to handle base 30.

Figure 4:
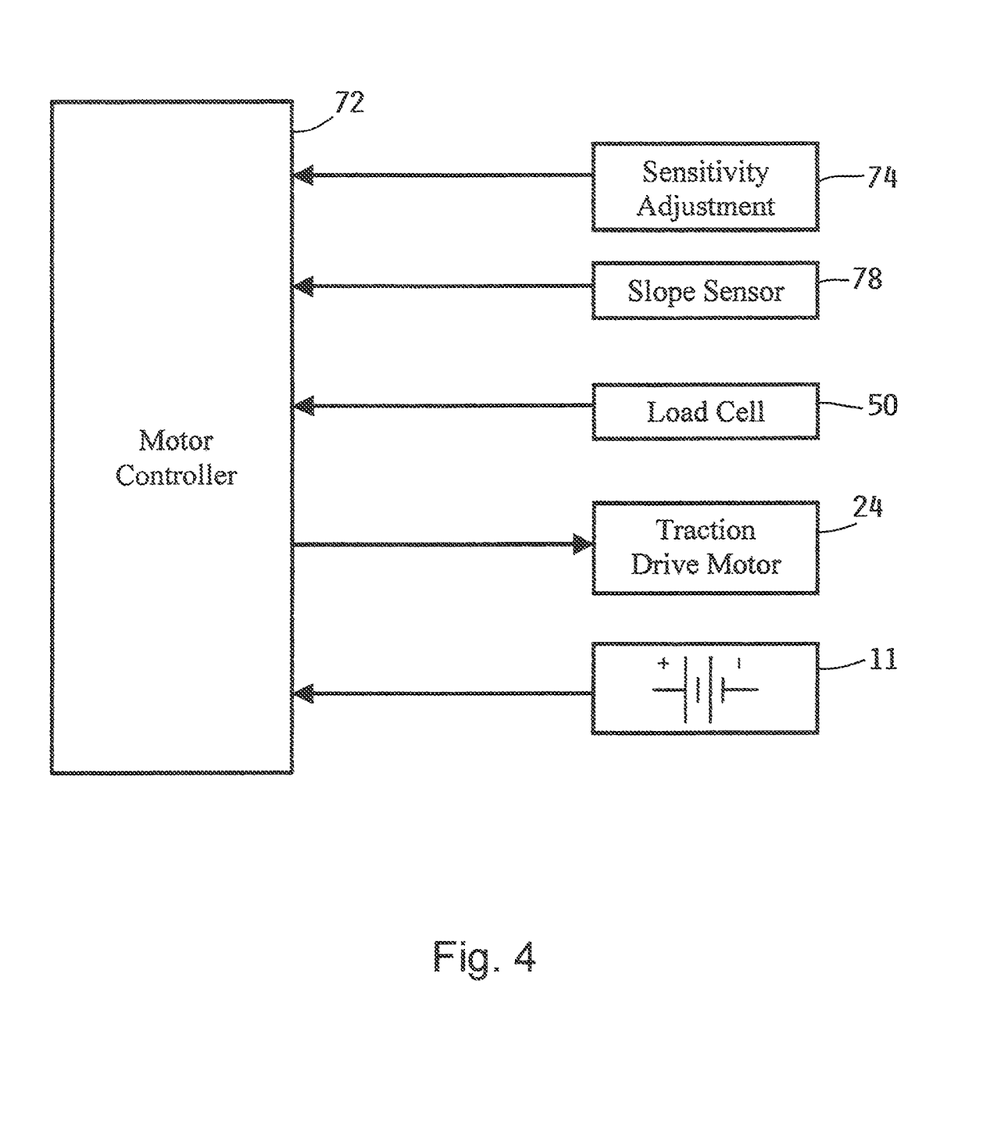
FIG. 4 is an electrical schematic of a control system for varying the ground speed of the mower of FIG. 1 according to the force applied by the operator to the handle grip of the mower.

FIG. 4 depicts a simplified schematic of the traction drive control system that uses the information from load cell 50 to vary the ground speed of mower 2 generally in concert with changes in the walking pace of the operator. The traction drive control system comprises an electronic, microcomputer based, motor controller 72, e.g. a RoboteQ SDC2160 Brushed DC Motor Controller, which converts commands received from load cell 50 into high voltage and high current output for driving up to two DC motors at up to 60V and 20 A per channel. Since the embodiment of this invention depicted in FIGS. 1-3 uses only a single traction drive motor 24, only one channel of controller 72 is used. However, in an alternative embodiment, two electric transmissions 22 providing two traction drive motors 24 could be used to drive each rear wheel 8 individually in which event both channels of controller 72 would be employed.

Battery pack 11 is connected to controller 72 and serves as the source of drive power for traction drive motor 24. In turn, motor 24 is connected to controller 72 and receives such drive power from controller 72 at variable levels that permit controller 72 to regulate the rotational speed of motor 24. Load cell 50 inputs into controller 72 the force applied to handle grip 38 by the operator as plus or minus voltage readings from a zero voltage reading in a neutral state (neither compressed or tensioned) of load cell 50. Controller 72 uses such readings to drive mower 2 in forward or reverse according to the magnitude of the plus or minus readings.

The Applicants have found that traction drive motor 24 is most effectively controlled by varying the torque of motor 24 by primarily controlling the current supplied to motor 24 rather than the voltage. Changing the voltage supplied to motor 24 can quickly change the rotational speed of motor 24 but may lead to increased instances where drive wheels 8 slip as mower 2 attempts to accelerate. In one embodiment of this invention, controller 72 supplies variable levels of current to motor 24 to control the ground speed of mower 2 through torque control. However, controller 72 additionally caps how fast the motor voltage can ramp up to thereby minimize wheel slippage. While this form of controller 72 uses both torque and voltage control to achieve the best results, controller 72 could employ either torque or voltage control alone if so desired.

In an alternative embodiment, load cell 50 could operate in compression or tension only. Using an example of a compression only load cell 50, load cell 50 would provide a zero or minimum voltage reading in an uncompressed state of load cell 50 and would provide a maximum voltage reading in a fully compressed state of load cell 50. In this embodiment, legs 42 of handle grip 38 and handle tubes 34 of handle base 32 would be fixed to one another. Turnbuckle 58 could then be used to set a preload on load cell 50.

For example, when using a compression only load cell 50 in mower 2, handle grip 38 would be set up relative to load cell 50, for example through operation of turnbuckle 58 or in any other suitable manner, such that load cell 50 is compressed to some degree, e.g. to a midpoint voltage reading between the minimum and maximum voltage readings, even when handle grip 38 has no operator applied force thereon. As the user pushes on handle grip 38 as he or she walks forwardly, load cell 50 would be further compressed with its voltage reading rising above the midpoint reading. Conversely, as the user pulls on handle grip 38 as he or she walks rearwardly, load cell 50 would be less compressed with its voltage reading falling below the midpoint reading. Controller 72 would then use the plus or minus change of the voltage reading above or below the midpoint voltage reading to set the ground speed of mower 2 by adjusting the torque or speed of traction drive motor 24 in forward or reverse, respectively.

Two additional inputs into controller 72 may also be optionally used, either singly or together, if so desired. Referring to FIG. 4, the first optional input is a sensitivity adjustment 74 that permits the operator to select how quickly or the magnitude to which the mower 2 responds to the force the operator applies to handle grip 38. This may be done by having a multi-position switch (not shown) mounted somewhere on mower 2, such as in a housing 76 shown in FIG. 1 located on handle 30, with such switch having different sensitivity settings. The selected setting will determine how quickly mower 2 will accelerate or decelerate as it adjusts the ground speed of mower 2 from a first speed to a second speed in response to changes in the force applied by the operator to handle grip 38.

Thus, if mower 2 appears to a particular operator to be jumpy in too quickly changing its ground speed, the operator can input a lower sensitivity setting for use in order to slow the ground speed response in the system. Conversely, if a particular operator feels that mower 2 is too sluggish in changing its ground speed, the operator can switch to a higher sensitivity setting. Rather than using a physical switch carried on mower 2 to input the sensitivity adjustment 74, the operator may be able to input such sensitivity adjustment 74 into controller 72 by some type of user interface carried on controller 72 or that is capable of being plugged into controller 72. The operator can then use this user interface and a data entry device contained in the user interface to input the desired sensitivity adjustment directly into the software of controller 72.

Finally, a slope sensor 78 is carried on cutting deck 4. Slope sensor 78 is connected to controller 72 to provide data on the slope or angle of cutting deck 4 of mower 2 about a substantially lateral, horizontal axis relative to a horizontal plane containing that axis. When the slope or angle exceeds a predetermined threshold, indicating that mower 2 is climbing or descending a hill for example, controller 72 will make a further adjustment in the speed of traction drive motor 24 to compensate. The amount of compensation is designed to allow the operator to maintain the same walking pace without having to push harder on handle grip 38, as mower 2 is driven forwardly up a hill, i.e. controller 72 increases the speed of motor 24 from the value set by the operator applied force on handle grip 38, and without having to pull back on handle grip 38 as mower 2 is driven down a hill, i.e. controller 72 decreases the speed of motor 24 from the value set by the operator applied force on handle grip 38.

Various other modifications will be apparent to those skilled in the art. For example, other ways and locations for mounting load cell 50 between handle grip 38 and handle base 32 could be used. Handle grip 38 need not have any telescopic motion relative to handle base 32 and thus may lack any legs 42 and escutcheon plate 44. Handle grip 38 could simply comprise the cross bar 36 of handle base 32 as long as cross bar 36 could slightly move or deflect relative to handle tubes 34 by an amount sufficient to fully compress or tension load cell 40, e.g. by approximately 0.001 inch. In such a design, load cell 50 would simply need to be placed between cross bar 36 and some portion of handle tubes 34 or an escutcheon plate 44 fixedly mounted to and extending between handle tubes 34. In this alternative design, handle grip 38 would not be present in the manner depicted herein, but would simply comprise a relatively movable or deflectable cross bar 36 in handle base 32.

Additionally, in the alternative embodiment where two traction motors 24 or electric transmissions 22 are used to individually power drive wheels 8, two load cells 50 could be used rather than a single load cell 50. Such dual load cells 50 could be placed in parallel with one load cell 50 being mounted in each handle tube 34 as an example. Alternatively, the dual load cells 50 could be placed perpendicularly to each other with one load cell 50 extending fore-and-aft in the general manner of load cell 50 shown in FIGS. 1 and 3 and the other load cell 50 extending laterally from side to side. In either configuration, the use of two load cells 50 would detect a difference in the force applied by the operator to laterally spaced portions of handle grip 38. This detected lateral difference in the applied force could then be used by controller 72 to rotate one motor 24 or transmission 22 on one side of mower 2 faster than the other motor 24 or transmission 22 on the other side of mower 2 for steering control of mower 2.

Various modifications of the embodiments of this invention as disclosed herein will be apparent to those of ordinary skill in the art. For example, while one embodiment of this invention as set forth herein provides bi-directional traction drive in forward and reverse, another embodiment may provide traction drive in a forward direction only. Accordingly, the scope of this invention is not limited to the specific embodiments disclosed herein.

The invention claimed is:

1. A walk power mower, which comprises:
   a housing having a rotary grass cutting blade;
   an electric motor to provide the housing with powered movement over the ground at a variable ground speed;
   a handle extending rearwardly from the housing to allow an operator to walk behind the housing and hold the handle and thereby guide the housing during its powered movement over the ground, the handle comprising:
      a handle base having a lower portion attached to the housing and an upper portion; and
      a handle grip telescopically mounted to the upper portion of the handle base, wherein the handle grip comprises a first leg, a second leg, a grip that extends between the first leg and the second leg, and an interconnecting member that extends between the first leg and the second leg;
   a force sensor mechanically attached both to the handle base and to the interconnecting member, the force sensor responsive to force applied by the operator to the handle grip relative to the handle base when the operator walks in a forward direction; and
   a control system which receives input from the force sensor to control the electric motor to increase the ground speed of the housing in the forward direction when the operator applies more force to the handle grip when the operator walks in the forward direction.

2. The mower of claim 1, wherein the force sensor is further responsive to force applied by the operator to the handle grip when the operator walks in a rearward direction, and wherein the control system further receives input from the force sensor to control the electric motor to increase the ground speed of the housing in the rearward direction when the operator applies more force to the handle grip when the operator walks in the rearward direction.

3. The mower of claim 2, wherein the force sensor comprises a load cell that is operable in both tension and compression.

4. The mower of claim 2, wherein the force sensor comprises a load cell that is operable in tension or compression only.

5. The mower of claim 4, wherein the load cell is preloaded to provide a reference output when the handle grip has no operator force applied thereto with load cell outputs other than the reference output being used by the control system to vary the ground speed of the housing.

6. The mower of claim 1, wherein a single force sensor is used to provide the input that is used to control the electric motor.

7. The mower of claim 1, wherein the force sensor is mechanically attached both to the handle base and to the interconnecting member along a longitudinal centerline of the handle.

8. The mower of claim 1, wherein the control system includes a sensitivity adjustment which permits the operator to select how quickly the ground speed of the housing responds to the force the operator applies to the handle grip.

9. The mower of claim 1, wherein the mower carries a slope sensor to detect when the mower is climbing or descending a hill, and wherein the control system receives input from the slope sensor to automatically increase or decrease whatever speed of the electric motor has been established by the force applied by the operator to the handle grip as the mower climbs or descends the hill, respectively.

10. The mower of claim 1, wherein the handle grip moves relative to the handle base by an amount that is imperceptible to a naked human eye to control the ground speed of the housing.

11. The mower of claim 1, wherein the handle grip moves relative to the handle base by an amount that does not substantially exceed 0.001 inch to control the ground speed of the housing.

12. The mower of claim 1, wherein the control system supplies variable levels of current to the electric motor to control the ground speed of the housing through torque control.

13. The mower of claim 1, wherein a vertical position of the handle grip is adjustable relative to the handle base.

14. A walk power mower, which comprises:
   a housing having a grass cutting blade;
   an electric motor to provide the housing with powered movement over the ground at a variable ground speed;
   a handle extending rearwardly from the housing to allow an operator to walk behind the housing and hold the handle and thereby guide the housing during its powered movement over the ground, the handle comprising:
- a handle base having a lower portion attached to the housing and an upper portion; and
- a handle grip slidably mounted to the upper portion of the handle base, wherein the handle grip comprises a first leg, a second leg, a grip that extends between the first leg and the second leg, and an interconnecting member that extends between the first leg and the second leg;
- a force sensor mechanically attached both to the handle base and to the handle grip, the force sensor responsive to force applied by the operator to the handle grip relative to the handle base when the operator walks in a forward direction; and
- a control system which receives input from the force sensor to control the electric motor to increase the ground speed of the housing in the forward direction when the operator applies more force to the handle grip when the operator walks in the forward direction.

15. The mower of claim 14, wherein the force sensor is further responsive to force applied by the operator to the handle grip when the operator walks in a rearward direction, and wherein the control system further receives input from the force sensor to control the electric motor to increase the ground speed of the housing in the rearward direction when the operator applies more force to the handle grip when the operator walks in the rearward direction.

16. The mower of claim 15, wherein the force sensor comprises a load cell that is operable in both tension and compression.

17. The mower of claim 14, wherein a single force sensor is used to provide the input that is used to control the electric motor.

18. The mower of claim 14, wherein the force sensor is mechanically attached both to the handle base and to a mounting bracket fixed to the interconnecting member such that the force sensor is aligned with a longitudinal centerline of the handle.

19. The mower of claim 14, wherein the mower carries a slope sensor to detect when the mower is climbing or descending a hill, and wherein the control system receives input from the slope sensor to automatically increase or decrease whatever torque of the electric motor has been established by the force applied by the operator to the handle grip as the mower climbs or descends the hill, respectively.

20. The mower of claim 14, wherein the control system includes a sensitivity adjustment which permits the operator to select how quickly the ground speed of the housing responds to the force the operator applies to the handle grip.

* * * * *